United States Patent
Watanabe et al.

(10) Patent No.: US 6,837,804 B2
(45) Date of Patent: Jan. 4, 2005

(54) TWO-PIECE SOLID GOLF BALL

(75) Inventors: Hideo Watanabe, Chichibu (JP); Yasushi Ichikawa, Chichibu (JP)

(73) Assignee: Bridgestone Sports Co., Ltd., Tokyo (JP)

(*) Notice: Subject to any disclaimer, the term of this patent is extended or adjusted under 35 U.S.C. 154(b) by 0 days.

(21) Appl. No.: 10/107,471

(22) Filed: Mar. 28, 2002

(65) Prior Publication Data

US 2003/0073516 A1 Apr. 17, 2003

Related U.S. Application Data

(60) Provisional application No. 60/305,138, filed on Jul. 16, 2001.

(30) Foreign Application Priority Data

Jun. 21, 2001 (JP) .................................... 2001-188055
Jul. 10, 2001 (JP) .................................... 2001-208800

(51) Int. Cl.$^7$ ............................................. A63B 37/06
(52) U.S. Cl. ..................................... 473/371; 473/378
(58) Field of Search ........................... 473/377, 378, 473/372, 383, 384, 374, 351; 525/123, 392, 127, 130

(56) References Cited

U.S. PATENT DOCUMENTS

| 4,347,338 A | * | 8/1982 | Torii et al. | 525/123 |
| 4,858,924 A | * | 8/1989 | Saito et al. | 473/373 |
| 5,252,652 A | * | 10/1993 | Egashira et al. | 473/372 |
| 5,803,834 A | * | 9/1998 | Yamagishi et al. | 473/372 |
| 6,142,888 A | * | 11/2000 | Higuchi et al. | 473/374 |

FOREIGN PATENT DOCUMENTS

| JP | 6-319830 | 11/1994 |
| JP | 9-215778 | 8/1997 |
| JP | 9-308708 | 12/1997 |

* cited by examiner

Primary Examiner—Glenn Caldarola
Assistant Examiner—Thanh Duong
(74) Attorney, Agent, or Firm—Sughrue Mion, PLLC

(57) ABSTRACT

Disclosed is a two-piece solid golf ball satisfying the following conditions (1) to (4):

(1) a cover predominantly contains a polyurethane material;
(2) the cover has a JIS C hardness of 72 to 89, and a thickness of 0.70 to 1.95 mm;
(3) a core is formed from a rubber material containing an organic sulfur compound; and
(4) a center portion of the core has a JIS C hardness of 58 to 68, a surface portion of the core has a JIS C hardness of 71 to 87, and a value obtained through subtraction of the JIS C hardness of the center portion of the core from the JIS C hardness of the surface portion of the core is 8 to 21.

The golf ball exhibits excellent feeling on impact, controllability, cut resistance, scratch resistance, and durability against cracking caused by repeated hitting, and has improved flight performance; i.e., an improved carrying distance particularly upon being hit upwind.

9 Claims, No Drawings

TWO-PIECE SOLID GOLF BALL

This application claims the benefit of provisional application Ser. No. 60/305,138 filed Sep. 16, 2001.

BACKGROUND OF THE INVENTION

1. Field of the Invention

The present invention relates to two-piece solid golf ball in which a polyurethane material serves as a cover-forming material; and more particularly to a golf ball which provides a highly satisfactory shot feeling on being hit and excellent controllability, which has improved flight performance, and which exhibits excellent cut resistance (i.e., durability when topped with an iron), scratch resistance, and durability against cracking caused by repeated hitting.

2. Description of the Related Art

Conventionally, various two-piece solid golf balls have been proposed in order to meet demands from professional golfers and advanced golfers. For example, Japanese Patent Application Laid-Open (kokai) No. 6-319830 (Japanese Patent No. 2576787) discloses a golf ball designed such that the value obtained by dividing the core hardness by the ball hardness, and the thickness of the cover fall within specific ranges, to thereby improve carrying distance, feeling on impact, and spin property. However, in the golf ball disclosed in this publication, since the cover is formed from an ionomer resin, the cover exhibits poor scratch resistance. In addition, the restitution of the core is insufficient, and there is still room for improvement in terms of carrying distance.

Japanese Patent Application Laid-Open (kokai) No. 9-308708 discloses a two-piece solid golf ball designed such that the thickness, flexural rigidity, and Shore D hardness of the cover fall within specific ranges, to thereby improve feeling on impact and controllability without lowering restitution and cut resistance. However, since the cover of this golf ball predominantly contains an ionomer resin, there is still room for improvement in terms of scratch resistance of the cover. In addition, the carrying distance, feeling on impact, and controllability of this golf ball are not simultaneously improved sufficiently, since properties of the core are not specified.

Meanwhile, Japanese Patent Application Laid-Open (kokai) No. 9-215778 discloses a two-piece solid golf ball having a cover formed from a polyurethane material. However, in this golf ball, since the cover is thick, the restitution of the core is insufficient, and the scratch resistance of the resin used for forming the cover is unsatisfactory, there is still room for improvement in terms of carrying distance and scratch resistance of the cover.

SUMMARY OF THE INVENTION

In view of the foregoing, an object of the present invention is to provide a two-piece solid golf ball which exhibits an excellent shot feeling for the player on impact with a club or putter, controllability, cut resistance, scratch resistance, and durability against cracking caused by repeated hitting, and which has improved flight performance; i.e., an improved carrying distance particularly upon being hit upwind, while satisfying professional golfers and golfers of advanced levels.

In order to achieve the above object, the present invention provides a two-piece solid golf hall comprising an outer cover and a solid core coated with the outer cover, wherein the outer cover predominantly contains a polyurethane material, has a JIS C hardness of 72 to 89, and has a thickness of 0.70 to 1.95 mm; the solid core is formed from a rubber material containing an organic sulfur compound; and a center portion of the core has a JIS C hardness of 58 to 68, a surface portion of the core has a JIS C hardness of 71 to 87, and a value obtained through subtraction of the JIS C hardness of the center portion of the core from the JIS C hardness of the surface portion of the core is 8 to 21.

In the golf ball of the present invention, the material of the cover is appropriately chosen; the thickness and hardness of the cover are determined in consideration of balance therebetween; and the hardness of the center portion of the core, the hardness of the surface portion of the core, and the difference between these hardnesses are appropriately determined. Thus, the aforementioned object is achieved.

DESCRIPTION OF THE INVENTION AND PREFERRED EMBODIMENTS

The present invention will next be described in detail. Firstly the outer cover of the golf ball of the present invention will be described. Since the outer cover predominantly contains a polyurethane material, the golf ball exhibits excellent shot feeling on impact, controllability, cut resistance, scratch resistance, and durability against cracking caused by repeated hitting, with restitution being maintained.

Preferably, the outer cover is formed from a cover-forming material (C) predominantly containing the following components (A) and (B):

(A) a thermoplastic polyurethane material, and (B) an isocyanate mixture in which an isocyanate compound (b-1)) having at least two isocyanate groups serving as functional groups in the molecule is dispersed in a thermoplastic resin (b-2) which is substantially non-reactive with the isocyanate groups.

In the present invention, when the outer cover is formed from the aforementioned cover-forming material (C), the resultant golf ball exhibits more excellent shot feeling on impact, controllability, cut resistance, scratch resistance, and durability against cracking caused by repeated hitting.

The aforementioned components (A) to (C) will next be described.

(A) Thermoplastic Polyurethane Material

The thermoplastic polyurethane material includes soft segments formed of a polymeric polyol (polymeric glycol), and a chain elongation agent and a diisocyanate constituting hard segments. No particular limitation is imposed on the polymeric polyol serving as a raw material, and the polymeric polyol may be any one selected from polymeric polyols which are conventionally employed in the technical field related to thermoplastic polyurethane materials. Examples of the polymeric polyol include polyester polyols and polyether polyols. Of these, polyether polyols are more preferred than polyester polyols, since a thermoplastic polyurethane material having high restitution elastic modulus and exhibiting excellent low-temperature properties can be synthesized. Examples of the polyether polyols include polytetramethylene glycol and polypropylene glycol. From the viewpoints of restitution elastic modulus and low-temperature property, polytetramethylene glycol is particularly preferred. The average molecular weight of the polymeric polyol is preferably 1,000 to 5,000. The average molecular weight is more preferably 2,000 to 4,000, in order to synthesize a thermoplastic polyurethane material having high restitution elastic modulus.

A chain elongation agent which is conventionally employed in the technical field related to thermoplastic polyurethane materials is preferably used. Examples of the chain elongation agent include, but are not limited to, 1,4-butylene glycol, 1,2-ethylene glycol, 1,3-butanediol, 1,6-hexanediol, and 2,2-dimethyl-1,3-propanediol. The average molecular weight of the chain elongation agent is preferably 20 to 15,000.

A diisocyanate which is conventionally employed in the technical field related to thermoplastic polyurethane materials is preferably used. Examples of the diisocyanate include, but are not limited to, aromatic diisocyanates such as 4,4'-diphenylmethane diisocyanate, 2,4-toluene diisocyanate, and 2,6-toluene diisocyanate; and aliphatic diisocyanates such as hexamethylene diisocyanate. Some diisocyanates encounter difficulty in controlling cross-linking reaction during injection molding. In the present invention, 4,4'-diphenylmethane diisocyanate, which is an aromatic diisocyanate, is most preferred, in consideration of stability in reaction with the below-described isocyanate mixture (B).

Preferred examples of the thermoplastic polyurethane material containing the aforementioned materials include commercially available polyurethane materials, such as Pandex T-8290, T-8295, and T-8260 (products of DIC Bayer Polymer Ltd.), and Resamine 2593 and 2597 (products of Dainichiseika Color & Chemicals Mfg. Co., Ltd.).

(B) Isocyanate Mixture

The Isocyanate mixture (B) is obtained by dispersing the isocyanate compound (b-1) having at least two isocyanate groups serving as functional groups in the molecule in the thermoplastic resin (b-2) which is substantially non-reactive with the isocyanate groups. The aforementioned isocyanate compound (b-1) is preferably an isocyanate compound which is conventionally employed for forming thermoplastic polyurethane materials. Examples of the isocyanate compound include, but are not limited to, aromatic diisocyanates such as 4,4'-diphenylmethane diisocyanate, 2,4-toluene diisocyanate, and 2,6-toluene diisocyanate; and aliphatic diisocyanates such as hexamethylene diisocyanate. Of these, 4,4'-diphenylmethane diisocyanate is most preferred, in consideration of reactivity and operational safety.

The aforementioned thermoplastic resin (b-2) is preferably a resin having low water-absorbability and high compatibility with the thermoplastic polyurethane material. Examples of the resin include polystyrene resins, polyvinyl chloride resins, ABS resins, polycarbonate resins, and polyester elastomers (e.g., polyether-ester block copolymers and polyester-ester block copolymers). Of these, in consideration of restitution elasticity and strength, polyester elastomers are preferred, with polyether-ester block copolymers being particularly preferred.

In the isocyanate mixture (B), the ratio by mass of the thermoplastic resin (b-2) and the isocyanate compound (b-1) is preferably 100:5 to 100:100, more preferably 100:10 to 100:40. When the ratio of the isocyanate compound (b-1) to the thermoplastic resin (b-2) is excessively low, a large amount of the isocyanate mixture (B) must be added to the thermoplastic polyurethane material (A), in order to achieve a successful cross-linking reaction between isocyanate compound (b-1) and the thermoplastic polyurethane material (A). As a result, the thermoplastic resin (b-2) greatly affects the thermoplastic polyurethane material (A), resulting in unsatisfactory properties of the cover-forming material (C). In contrast, when the ratio of the isocyanate compound (b-1) to the thermoplastic resin (b-2) is excessively high, thorough and satisfactory kneading of the isocyanate compound (b-1) into the thermoplastic resin (b-2) is not attained, possibly resulting in failure of preparation of the isocyanate mixture (B).

The isocyanate mixture (B) can be obtained through, for example, the following procedure: the isocyanate compound (b-1) is incorporated into the thermoplastic resin (b-2), and the resultant mixture is kneaded well by use of a mixing roll or a banbury mixer at 130 to 250° C., followed by pelletization or pulverization after cooling. Preferred examples of the isocyanate mixture (B) include commercially available isocyanate mixtures such as Crossnate EM30 (product of Dainichiseika Color & Chemicals Mfg. Co., Ltd.).

(C) Cover-Forming Material

The cover-forming material (C) predominantly contains the aforementioned thermoplastic polyurethane material (A) and isocyanate mixture (B). In the cover-forming material (C), the ratio by mass of the thermoplastic polyurethane material (A) and the isocyanate mixture (B) is preferably 100:1 to 100:100, more preferably 100:5 to 100:50, much more preferably 100:10 to 100:30. When the ratio of the isocyanate mixture (B) to the thermoplastic polyurethane material (A) is excessively low, the isocyanate mixture (B) exerts insufficient cross-linking effect, whereas when the ratio is excessively high, unreacted isocyanate imparts a color to the resultant cover-forming material.

The cover-forming material (C) may contain other components in addition to the aforementioned components. Examples of such "other components" include thermoplastic polymer materials other than the thermoplastic polyurethane material, such as polyester elastomer, polyamide elastomer, ionomer resin, styrene block elastomer, polyethylene, and nylon resin. In this case, the incorporation amount of thermoplastic polymer materials other than the thermoplastic polyurethane material is 0 to 100 parts by mass, preferably 10 to 75 parts by mass, more preferably 10 to 50 parts by mass, on the basis of 100 parts by mass of the thermoplastic polyurethane material which serves as an essential component. The incorporation amount is appropriately determined in accordance with various purposes, including regulation of the hardness of the cover-forming material and improvement of the restitution, fluidity, and adhesion of the cover-forming material. If desired, the cover-forming material (C) may further contain various additives, such as pigments, dispersants, antioxidants, light-resistant stabilizers, UV absorbers, and release agents.

An outer cover can be formed from the cover-forming material (C) through, for example, the following procedure: the thermoplastic polyurethane material (A) is added to the isocyanate mixture (B) and then dry-mixed, and a cover is formed from the resultant mixture around a core by use of an injection molding apparatus. The formation temperature varies with the type of the thermoplastic polyurethane material (A), but is typically 150 to 250° C.

In the resultant golf ball cover, reaction or cross-linking is thought to proceed as follows: an isocyanate group is reacted with a residual OH group of the thermoplastic polyurethane material, to thereby form an urethane bond; or an isocyanate group is added to an urethane group of the thermoplastic polyurethane material, to thereby form an allophanate or biuret cross-linking structure. In this case, although cross-linking proceeds insufficiently immediately after injection molding of the cover-forming material (C), cross-linking proceeds through annealing after injection molding, and the resultant golf ball cover is imparted with useful properties. As used herein, the term "annealing" refers to aging through heating at a certain temperature for a predetermined period of time, or aging at room temperature for a predetermined period of time.

In the golf ball of the present invention, the JIS C hardness of the outer cover is 72 to 89, preferably 73 to 86, more preferably 74 to 83. When the cover is excessively soft, the golf ball spins excessively upon being hit with a driver (No. 1 wood). As a result, the ball follows a steep trajectory; i.e., the ball is "skyed" and the carrying distance decreases. In contrast, when the cover is excessively hard, controllability and durability against cracking caused by repeated hitting are deteriorated.

In the golf ball of the present invention, the thickness of the outer cover is 0.7 to 1.95 mm, preferably 1.0 to 1.85 mm, more preferably 1.4 to 1.7 mm. When the cover is excessively thin, cut resistance and durability against cracking caused by repeated hitting may be deteriorated. In addition, the golf ball may spin excessively upon being shot with a driver, and as a result, the ball follows a steep trajectory; i.e., the ball is "skyed" and the carrying distance decreases. In contrast, when the cover is excessively thick, restitution of the golf ball may be lowered, resulting in a decrease in carrying distance or a dull feeling of the ball upon being hit with a putter.

The solid core will next be described. The solid core of the golf ball of the present invention is formed from a rubber material containing an organic sulfur compound. Therefore, the golf ball has sufficient restitution and a long carrying distance.

No particular limitation is imposed on the base rubber of the aforementioned rubber material, and the base rubber may be any base rubber which is generally used in a core. The base rubber is preferably polybutadiene, more preferably cis-1,4-polybutadiene in which cis segments account for at least 40%. If desired, the base rubber may contain, in addition to polybutadiene, other rubber components such as natural rubber, polyisoprene rubber, and styrene-butadiene rubber.

The aforementioned rubber material contains an organic sulfur compound in addition to the base rubber, in order to impart excellent restitution to the resultant golf ball. Preferred examples of the organic sulfur compound include thiophenol, thionaphthol, halogenated thiophenol, and metallic salts thereof. Specific examples include zinc salts of pentachlorothiophenol, pentafluorothiophenol, pentabromothiophenol, parachlorothiophenol, and pentachlorothiophenol; S2–S4 diphenyl polysulfides; S2–S4 dibenzyl polysulfides; S2–S4 dibenzoyl polysulfides; S2–S4 dibenzothiazoyl polysulfides; and S2–S4 dithiobenzoyl polysulfides. Of these, a zinc salt of pentachlorothiophenol or diphenyl disulfide is particularly preferred.

In the aforementioned rubber material, the incorporation amount of the organic sulfur compound is typically at least 0.05 parts by mass, and is preferably at least 0.1 parts by mass, more preferably 0.2 parts by mass, on the basis of 100 parts by mass of the base rubber. When the incorporation amount of the organic sulfur compound is excessively low, improvement of restitution of the golf ball is not expected. The upper limit of the incorporation amount of the organic sulfur compound is typically 2.0 parts by mass or less, and is preferably 1.2 parts by mass or less, more preferably 1.0 part by mass or less, on the basis of 100 parts by mass of the base rubber.

When the incorporation amount of the organic sulfur compound is excessively high, further improvement of restitution of the golf ball (particularly restitution of the golf ball upon being hit with a driver) is not expected, and the core of the golf ball may become very soft and feeling on impact may be impaired.

In the golf ball of the present invention, the JIS C hardness of the center portion of the core is 58 to 68, preferably 60 to 67, more preferably 62 to 66. When the hardness of the center portion of the core is excessively low, feeling on impact may become too dull, durability against cracking caused by repeated hitting may be impaired, and the initial velocity of the golf ball may be decreased. When the hardness of the center portion of the core is excessively high, shot on impact may become too strong, and the golf ball may spin excessively upon being hit with a driver. As a result, the ball follows a steep trajectory; i.e., the ball is "skyed" and the carrying distance decreases.

In the golf ball of the present invention, the JIS C hardness of the surface portion of the core is 71 to 87, preferably 74 to 86, more preferably 77 to 85. When the hardness of the surface portion of the core is excessively low, feeling on impact may become too dull, and the golf ball may spin excessively upon being hit with a driver. As a result, the ball follows a steep trajectory; i.e., the ball is "skied" and the carrying distance decreases. In contrast, when the hardness of the surface portion of the core is excessively high, shot on impact may become too strong, and scratch resistance may be deteriorated.

In the golf ball of the present invention, the value obtained through subtraction of the JIS C hardness of the center portion of the core from the JIS C hardness of the surface portion of the core is 8 to 21, preferably 11 to 20, more preferably 14 to 19. When the subtraction value is excessively small, the golf ball may spin excessively upon being shot with a driver. As a result, the ball follows a steep trajectory; i.e., the ball is "skied" and the carrying distance decreases. In contrast, when the subtraction value is excessively large, restitution of the golf ball may be impaired, resulting in a decrease in carrying distance, and durability against cracking caused by repeated hitting may be deteriorated.

The golf ball of the present invention is formed so as to have a diameter and a mass as specified under the Rules of Golf approved by R&A. Typically, the diameter is at least 42.67 mm, and the mass is 45.93 g or less. The diameter is preferably 42.67 to 42.9 mm. The deformation amount of the golf ball under application of a load of 980 N (100 kg) is preferably 2.0 to 4.0 mm, more preferably 2.2 to 3.8 mm.

EXAMPLES

The present invention will next be described in detail by way of Examples, which should not be construed as limiting the invention thereto.

Examples and Comparative Examples

The components of the core composition shown in Tables 1 through 3 (unit: part(s) by mass) were kneaded, and then vulcanized under the conditions shown in Tables 1 through 3, to thereby obtain solid cores for two-piece solid golf balls. Components of the core compositions shown in Tables 1 through 3 are as follows.

Polybutadiene Rubber (1)
 BR11(product of Japan Synthetic Rubber Co., Ltd.)
Polybutadiene Rubber (2)
 BR18 (product of Japan Synthetic Rubber Co., Ltd.)
Peroxide (1)
 Dicumyl peroxide: Percumyl D (product of Nippon Oil & Fats Co., Ltd.)
Peroxide (2)
 1,1-bis(t-butylperoxy)-3,3,5-trimethylcyclohexane: Perhexa 3M-40 (product of Nippon Oil & Fats Co., Ltd.)
Antioxidant
 Nocrac NS-6 (product of Ouchi Shinko Chemical Industrial Co., Ltd.)

Cover compositions shown in Table 4 (unit: part(s) by mass) were kneaded at a predetermined temperature, to thereby obtain cover-forming materials. Components of the cover compositions shown in Table 4 are as follows.

Polyurethane 1 (Thermoplastic Polyurethane Material)
  Pandex T8295: MDI-PTMG-type thermoplastic polyurethane material (product of DIC Bayer Polymer Ltd.) (JIS A surface hardness: 97, restitution elastic modulus: 44%)

Polyurethane 2 (Thermoplastic Polyurethane Material)
  Pandex T7295: Non-yellowing-type thermoplastic polyurethane material containing aliphatic isocyanate (product of DIC Bayer Polymer Ltd.) (JIS A surface hardness: 95)

Ionomer Resin 1
  Himilan 1557 (product of DuPont-Mitsui Polychemicals Co., Ltd.)

Ionomer Resin 2
  Himilan 1855 (product of DuPont-Mitsui Polychemicals Co., Ltd.)

Ionomer Resin 3
  Himilan 1605 (product of DuPont-Mitsui Polychemicals Co., Ltd.)

Ionomer Resin 4
  Himilan 1601 (product of DuPont-Mitsui Polychemicals Co., Ltd.)

Ionomer Resin 5
  Surlyn 8120 (product of DuPont)

Copolymer 1
  Nucrel AN4311 (product of DuPont-Mitsui Polychemicals Co., Ltd.)

Isocyanate Mixture
  Crossnate EM30: Isocyanate master batch (product of Dainichiseika Color & Chemicals Mfg. Co., Ltd.) containing 30% 4,4'-diphenylmethane diisocyanate (isocyanate concentration as measured through amine back titration according to JIS-K1556: 5–10%, master batch base resin: polyester elastomer)

Subsequently, each of the aforementioned solid cores was placed in a die for injection molding, and a cover was formed from each of the cover materials around the core by means of injection molding, to thereby produce a two-piece solid golf ball (Examples 1 through 4 and Comparative Examples 2 through 10). In the golf ball of Comparative Example 1, the cover was formed through compression molding. Thereafter, properties of the resultant golf balls were evaluated. The evaluation methods are described below. Cover properties were measured by use of a sheet (thickness: 2 mm) formed through injection molding. The results are shown in Tables 1 through 3.

Initial Velocity

The initial velocity of the golf ball was measured by use of an initial velocity measurement apparatus similar to a USGA-type initial velocity meter.

Flight Performance

The golf ball was hit under upwind conditions (wind speed: 5 m/s) at a head speed (HS) of 45 m/s by use of a driver (W #1) mounted on a swing robot, to thereby measure a carrying distance and a spin rate. The carrying distance was evaluated on the basis of the following criteria.
  ○: Total distance is 226 m or more
  Δ: Total distance is more than 225 m and less than 226 m
  x: Total distance is 225 m or less Controllability The golf ball was hit at a head speed (HS) of 20 m/s by use of a sand wedge (SW) mounted on a swing robot, to thereby measure a spin rate. Evaluation of the spin rate (approach spin evaluation) was performed on the basis of the following criteria.

○: Spin rate is 5,500 rpm or more x: Spin rate is less than 5,500 rpm

Feeling

Three professional golfers hit the golf balls by use of a driver (W #1) and a putter (PT), and evaluated their feelings on impact on the basis of the following criteria.

○: Good x: Too strong or too soft

Durability against Cracking (Durability against Cracking Caused by Repeated Hitting)

In order to evaluate durability against cracking caused by repeated hitting, the golf ball was hit repeatedly, and the number of hits counted when the initial velocity decreased by a certain amount was employed as an index. Specifically, the golf ball was hit repeatedly at a head speed of 50 m/s by use of a driver (W #1) mounted on a swing robot, and the number of hits (n) counted when the initial velocity at the (n+1)-th hit decreases by 2% from that at the n-th hit was measured. The actual number of hits of the golf ball of Example 2 after which the initial velocity decreased in the aforementioned manner was taken as 100, and durability against cracking was evaluated on the basis of the following criteria.

○: 100 or more x: Less than 95

Scratch Resistance

The golf ball was hit at a head speed of 45 m/s by use of a pitching wedge (V-groove type) mounted on a swing robot machine. Thereafter, the condition of the resultant golf ball was visually evaluated on the basis of the following criteria.

○: Still usable x: Not usable

Cut Resistance (Durability when Topped with an Iron)

The golf ball was topped at a head speed of 45 m/s by use of a pitching wedge mounted on a swing robot machine. Thereafter, the condition of the resultant golf ball was visually evaluated on the basis of the following criteria.

○: Still usable x: Not usable

TABLE 1

|  |  | Ex. 1 | Ex. 2 | Ex. 3 | Ex. 4 |
|---|---|---|---|---|---|
| Solid core | Outer diameter (mm) | 38.90 | 39.70 | 39.30 | 39.30 |
|  | Weight (g) | 34.4 | 36.5 | 35.4 | 35.4 |
|  | Surface JIS C hardness (A) | 82 | 82 | 85 | 79 |
|  | Center JIS C hardness (B) | 64 | 64 | 66 | 63 |
|  | (A)–(B) | 18 | 18 | 19 | 16 |
| Outer cover | Composition | (1) | (1) | (1) | (1) |
|  | JIS C hardness | 77 | 77 | 77 | 77 |
|  | Thickness (mm) | 1.90 | 1.50 | 1.70 | 1.70 |
| Ball | Outer diameter (mm) | 42.70 | 42.70 | 42.70 | 42.70 |
|  | Weight (g) | 45.3 | 45.3 | 45.3 | 45.3 |
|  | Initial velocity (m/s) | 77.0 | 77.3 | 77.2 | 76.9 |
| Core composition (part(s) by mass) | Polybutadiene rubber (1) | 70 | 70 | 70 | 70 |
|  | Polybutadiene rubber (2) | 30 | 30 | 30 | 30 |
|  | Zinc acrylate | 34.0 | 34.0 | 37.0 | 32.0 |
|  | Peroxide (1) | 0.6 | 0.6 | 0.6 | 0.6 |
|  | Peroxide (2) | 0.6 | 0.6 | 0.6 | 0.6 |
|  | Antioxidant | 0.2 | 0.2 | 0.2 | 0.2 |
|  | Zinc oxide | 10.9 | 10.7 | 9.6 | 11.8 |
|  | Pentachlorothiophenol zinc salt | 1.0 | 1.0 | 1.0 | 1.0 |
|  | Zinc stearate | 5 | 5 | 5 | 5 |
| Vulcanization | First Step Temperature | 155° C. | 155° C. | 155° C. | 155° C. |
|  | First Step Time | 15 min | 15 min | 15 min | 15 min |
|  | Second Step Temperature | — | — | — | — |
|  | Second Step Time | — | — | — | — |
| Flight performance | W #1 HS45 Upwind (5 m/s) Carry (m) | 210.8 | 211.6 | 211.2 | 209.8 |
|  | Total (m) | 226.3 | 226.8 | 227.0 | 226.5 |
|  | Spin (rpm) | 2589 | 2734 | 2719 | 2815 |
|  | Carrying distance evaluation | ○ | ○ | ○ | ○ |
| Controllability | SW HS20 Spin (rpm) | 5821 | 5823 | 5852 | 5778 |
|  | Approach spin evaluation | ○ | ○ | ○ | ○ |
| Feeling | W #1 | ○ | ○ | ○ | ○ |
|  | PT | ○ | ○ | ○ | ○ |
| Durability | Durability against cracking | ○ | ○ | ○ | ○ |
|  | Anti-scratch property | ○ | ○ | ○ | ○ |
|  | Anti-cut property | ○ | ○ | ○ | ○ |

TABLE 2

|  |  | Comp. Ex. 1 | Comp. Ex. 2 | Comp. Ex. 3 | Comp. Ex. 4 | Comp. Ex. 5 |
|---|---|---|---|---|---|---|
| Solid core | Outer diameter (mm) | 41.50 | 38.50 | 39.70 | 39.30 | 38.90 |
|  | Weight (g) | 41.7 | 33.3 | 36.5 | 35.4 | 34.4 |
|  | Surface JIS C hardness (A) | 85 | 79 | 80 | 85 | 82 |
|  | Center JIS C hardness (B) | 66 | 63 | 75 | 63 | 64 |
|  | (A)–(B) | 19 | 16 | 5 | 22 | 18 |
| Outer cover | Composition | (1) | (1) | (1) | (1) | (1) |
|  | JIS C hardness | 77 | 77 | 77 | 77 | 77 |
|  | Thickness (mm) | 0.60 | 2.10 | 1.50 | 1.70 | 1.90 |
| Ball | Outer diameter (mm) | 42.70 | 42.70 | 42.70 | 42.70 | 42.70 |
|  | Weight (g) | 45.3 | 45.3 | 45.3 | 45.3 | 45.3 |
|  | Initial velocity (m/s) | 77.7 | 76.6 | 77.6 | 76.7 | 76.5 |
| Core composition (part(s) by mass) | Polybutadiene rubber (1) | 70 | 70 | 70 | 70 | 70 |
|  | Polybutadiene rubber (2) | 30 | 30 | 30 | 30 | 30 |
|  | Zinc acrylate | 37.0 | 32.0 | 34.7 | 30.0 | 29.5 |
|  | Peroxide (1) | 0.6 | 0.6 | 0.6 | 0.6 | 0.6 |
|  | Peroxide (2) | 0.6 | 0.6 | 0.6 | 0.6 | 0.6 |
|  | Antioxidant | 0.2 | 0.2 | 0.2 | 0 | 0.2 |
|  | Zinc oxide | 9.2 | 11.8 | 9.8 | 12.7 | 12.9 |
|  | Pentachlorothiophenol zinc salt | 1.0 | 1.0 | 1.0 | 1.0 | 0.0 |
|  | Zinc stearate | 5 | 5 | 0 | 5 | 0 |

TABLE 2-continued

|  |  |  | Comp. Ex. 1 | Comp. Ex. 2 | Comp. Ex. 3 | Comp. Ex. 4 | Comp. Ex. 5 |
|---|---|---|---|---|---|---|---|
| Vulcanization | First step | Temperature | 155° C. | 155° C. | 145° C. | 165° C. | 155° C. |
|  |  | Time | 15 min | 15 min | 30 min | 15 min | 15 min |
|  | Second step | Temperature | — | — | 170° C. | — | — |
|  |  | Time | — | — | 10 min | — | — |
| Flight performance | W #1 HS45 | Carry (m) | 213.6 | 208.3 | 211.7 | 210.1 | 208.8 |
|  |  | Total m | 224.8 | 224.6 | 223.4 | 225.2 | 224.7 |
|  | Upwind (5 m/s) | Spin (rpm) | 2880 | 2645 | 2955 | 2560 | 2585 |
|  | Carrying distance evaluation |  | x | x | x | Δ | x |
| Controllability | SW HS20 | Spin (rpm) | 5855 | 5775 | 5899 | 5801 | 5822 |
|  | Approach spin evaluation |  | ○ | ○ | ○ | ○ | ○ |
| Feeling | W #1 |  | ○ | ○ | x | ○ | ○ |
|  | PT |  | ○ | ○ | ○ | ○ | ○ |
| Durability | Durability against cracking |  | ○ | ○ | ○ | x | ○ |
|  | Anti-scratch property |  | ○ | ○ | ○ | ○ | ○ |
|  | Anti-cut property |  | x | ○ | ○ | ○ | ○ |

TABLE 3

|  |  | Comp. Ex. 6 | Comp. Ex. 7 | Comp. Ex. 8 | Comp. Ex. 9 | Comp. Ex. 10 |
|---|---|---|---|---|---|---|
| Solid core | Outer diameter (mm) | 38.90 | 39.70 | 38.90 | 39.70 | 38.90 |
|  | Weight (g) | 35.6 | 36.5 | 34.4 | 35.9 | 35.6 |
|  | Surface JIS C hardness (A) | 82 | 88 | 72 | 85 | 79 |
|  | Center JIS C hardness (B) | 64 | 69 | 57 | 66 | 63 |
|  | (A)–(B) | 18 | 19 | 15 | 19 | 16 |
| Outer cover | Composition | (2) | (1) | (1) | (3) | (4) |
|  | JIS C hardness | 77 | 77 | 77 | 71 | 91 |
|  | Thickness (mm) | 1.90 | 1.50 | 1.90 | 1.50 | 1.90 |
| Ball | Outer diameter (mm) | 42.70 | 42.70 | 42.70 | 42.70 | 42.70 |
|  | Weight (g) | 45.3 | 45.3 | 45.3 | 45.3 | 45.3 |
|  | Initial velocity (m/s) | 76.8 | 77.7 | 76.3 | 77.3 | 77.1 |
| Core composition (part(s) by mass) | Polybutadiene rubber (1) | 70 | 70 | 70 | 70 | 70 |
|  | Polybutadiene rubber (2) | 30 | 30 | 30 | 30 | 30 |
|  | Zinc acrylate | 34.0 | 40.0 | 23.5 | 37.0 | 27.0 |
|  | Peroxide (1) | 0.6 | 0.6 | 0.6 | 0.6 | 0.6 |
|  | Peroxide (2) | 0.6 | 0.6 | 0.6 | 0.6 | 0.6 |
|  | Antioxidant | 0.2 | 0.2 | 0.2 | 0.2 | 0.2 |
|  | Zinc oxide | 17.9 | 8.1 | 15.5 | 6.3 | 20.4 |
|  | Pentachlorothiophenol zinc salt | 1.0 | 1.0 | 1.0 | 1.0 | 0.2 |
|  | Zinc stearate | 5 | 5 | 5 | 5 | 0 |
| Vulcanization | First step Temperature | 155° C. | 155° C. | 155° C. | 155° C. | 155° C. |
|  | First step Time | 15 min | 15 min | 15 min | 15 min | 15 min |
|  | Second step Temperature | — | — | — | — | — |
|  | Second step Time | — | — | — | — | — |
| Flight performance | W #1 HS45 Carry (m) | 210.0 | 211.2 | 208.5 | 207.7 | 212.1 |
|  | Total m | 225.5 | 225.8 | 223.0 | 222.4 | 227.5 |
|  | Upwind (5 m/s) Spin (rpm) | 2559 | 3014 | 2449 | 3130 | 2365 |
|  | Carrying distance evaluation | Δ | Δ | x | x | ○ |
| Controllability | SW HS20 Spin (rpm) | 5675 | 5924 | 5658 | 6627 | 4825 |
|  | Approach spin evaluation | ○ | ○ | ○ | ○ | x |
| Feeling | W #1 | ○ | x | x | ○ | ○ |
|  | PT | ○ | x | ○ | ○ | x |
| Durability | Durability against cracking | ○ | ○ | x | ○ | x |
|  | Anti-scratch property | x | x | ○ | ○ | ○ |
|  | Anti-cut property | ○ | x | ○ | ○ | ○ |

TABLE 4

| Cover composition (parts by mass) | (1) | (2) | (3) | (4) |
|---|---|---|---|---|
| Polyurethane 1 | 100 | — | — | — |
| Polyurethane 2 | — | — | 100 | — |
| Ionomer resin 1 | — | 20 | — | 50 |
| Ionomer resin 2 | — | 30 | — | — |
| Ionomer resin 3 | — | — | — | 20 |
| Ionomer resin 4 | — | — | — | 30 |
| Ionomer resin 5 | — | 30 | — | — |
| Copolymer 1 | — | 20 | — | — |
| Titanium oxide | 4 | 3 | 4 | 4 |
| Polyethylene wax | 1.5 | — | 1.5 | — |
| Isocyanate mixture | 10 | — | — | — |

As is clear from Tables 1 through 3, the golf balls of the present invention exhibit excellent flight performance, controllability, feeling on impact, and durability against cracking. In contrast, the golf balls of Comparative Examples involve the following drawbacks.

Comparative Example 1

Since the cover is thin, the golf ball spins excessively upon being hit with a driver. As a result, the ball follows a steep trajectory; i.e., the ball is "skyed" and the carrying distance decreases. In addition, the golf ball exhibits poor durability when topped with an iron.

Comparative Example 2

Since the cover is thick, the initial velocity of the golf ball is low, and the carrying distance of the ball upon being hit with a driver is short.

Comparative Example 3

Since the difference in hardness between the surface and center of the core is small, the golf ball spins excessively upon being shot with a driver. As a result, the ball follows a steep trajectory; i.e., the ball is "skyed" and the carrying distance decreases. In addition, since the hardness of the center of the core is high, the golf ball provides a strong shot feeling upon being hit with a driver.

Comparative Example 4

Since the difference in hardness between the surface and center of the core is large and the initial velocity of the golf ball is somewhat low, the carrying distance of the ball upon being shot with a driver is slightly short, and durability against cracking caused by repeated hitting is poor.

Comparative Example 5

Since the core does not contain an organic sulfur compound, the initial velocity of the golf ball is low, and the carrying distance of the ball upon being shot with a driver is short.

Comparative Example 6

Since the cover is formed from an ionomer resin, the initial velocity of the golf ball is somewhat low, the carrying distance of the ball upon being shot with a driver is slightly short, and scratch resistance is poor.

Comparative Example 7

Since the hardness of the surface and center of the core is high, the golf ball provides a strong shot feeling on impact, and the ball spins excessively upon being hit with a driver, resulting in a slightly short carrying distance. In addition, since the surface of the core is hard, scratch resistance and durability when topped with an iron are poor.

Comparative Example 8

Since the hardness of the center of the core is excessively low, the golf ball provides an unacceptably soft shot feeling upon being hit with a driver, and durability against cracking caused by repeated hitting is poor. In addition, the initial velocity of the ball is low, and the carrying distance is short.

Comparative Example 9

Since the hardness of the cover is excessively low, the golf ball spins excessively upon being hit with a driver. As a result, the ball follows a steep trajectory; i.e., the ball is "skyed" and the carrying distance decreases.

Comparative Example 10

Since the hardness of the cover is excessively high, the golf ball provides an unacceptably strong shot feeling upon being hit with a putter, and approach spin rate is low; i.e., controllability is poor.

As described above, the two-piece solid golf ball of the present invention exhibits excellent feeling on impact, controllability, cut resistance, scratch resistance, and durability against cracking caused by repeated hitting, and has improved flight performance; i.e., an improved carrying distance, particularly upon being hit upwind, while fully satisfying professional golfers and golfers of advanced levels. The carrying distance of the golf ball upon being hit upwind improves for the reasons described below. Since the initial velocity of the ball is sufficient and the spin rate falls within an appropriate range, the ball follows an ideal trajectory; i.e., the ball does not follow a steep trajectory or a drop trajectory. A golf ball having a short carrying distance upon being hit upwind is not favored by professional golfers and advanced golfers. However, the golf ball of the present invention meets demands of professional golfers and advanced golfers, since the golf ball has a long carrying distance upon being hit upwind.

What is claimed is:

1. A two-piece solid golf ball comprising an outer cover and a solid core coated with the outer cover, wherein the outer cover is formed from a cover-forming material (C) predominantly containing the following components (A) and (B):

(A) a thermoplastic polyurethane material including a polyether polyol of polytetramethylene glycol, and (B) an isocyanate mixture in which an isocyanate compound (b-1) having at least two isocyanate groups serving as functional groups in the molecule is dispersed in a thermoplastic resin (b-2) which is substantially non-reactive with the isocyanate groups, wherein the thermoplastic resin is a polyester elastomer composed of an ether-ester block copolymer;

the outer cover has a JIS C hardness of 72 to 89, and has a thickness of 0.70 to 1.95 mm; the solid core is formed from a rubber material containing an organic sulfur compound; and a center portion of the core has a JIS C hardness of 58 to 68, a surface portion of the core has a JIS C hardness of 71 to 87, and a value obtained through subtraction of the JIS C hardness of the center portion of the core from the JIS C hardness of the surface portion of the core is 8 to 21.

2. A two-piece solid golf ball according to claim 1, wherein the JIS C hardness of the outer cover is 73 to 86.

3. A two-piece solid golf ball according to claim 1, wherein the thickness of the outer cover is 1.0 to 1.85 mm.

4. A two-piece solid golf ball according to claim 1, wherein the JIS C hardness of the center portion of the core is 60 to 67.

5. A two-piece solid golf ball according to claim 1, wherein the JIS C hardness of the surface portion of the core is 74 to 86.

6. A two-piece solid golf ball according to claim 1, wherein the value obtained through subtraction of the JIS C hardness of the center portion of the core from the JIS C hardness of the surface portion of the core is 11 to 20.

7. A two-piece solid golf ball according to claim 1, wherein the thermoplastic polyurethane material (A) includes soft segments formed of a polymeric polyol, and a chain elongation agent and a diisocyanate constituting hard segments.

8. A two-piece solid golf ball according to claim 1, wherein the ratio by mass of the thermoplastic polyurethane material (A) and the isocyanate mixture (B) is 100:1 to 100:100.

9. A two-piece solid golf ball according to claim 1, wherein said polyether polyol of the thermoplastic polyurethane material (A) has average molecular weight between 1000 and 5000.

* * * * *